UNITED STATES PATENT OFFICE.

CARL V. PETRAEUS, OF PHILADELPHIA, PENNSYLVANIA.

MANUFACTURE OF ALUMINOUS CAKE.

SPECIFICATION forming part of Letters Patent No. 225,300, dated March 9, 1880.

Application filed November 29, 1879.

*To all whom it may concern:*

Be it known that I, CARL V. PETRAEUS, of the city of Philadelphia, Pennsylvania, have invented an Improvement in the Manufacture of Aluminous Cake, of which the following is a specification.

The object of this invention is to decolorize the iron in aluminous cake made from materials such as kaolin, bauxites, &c., by reducing it to the state of a protoxide, and at the same time render the aluminous cake more basic than it otherwise can be made without loss of aluminous material.

Heretofore this has been done by F. Laur (Letters Patent No. 220,720, October 21, 1879) by adding metallic zinc to the ferruginous solution of sulphate of alumina; but this method is rather expensive on account of the high price of metallic zinc or spelter.

In the English patent to Condy, No. 4,618 of 1877, is described a process of making colorless aluminous cake, in which sulphides are used to change the oxide of iron contained in the aluminous material to the state of sulphide which is soluble in acids; but the sulphides are added to the raw aluminous material before it is acted upon by acids.

In the English patent to Dixon aluminous material is dissolved in molten carbonated or caustic soda, and to save these chemicals he adds sulphide of sodium in order to decompose the oxide of iron and change it into sulphide of iron. In this case the sulphide of sodium is mixed with the aluminous material and no acid is used.

In both of the above cases no free acid is present when the sulphide comes in contact with the oxide of iron.

I have, however, found that the reduction of the peroxide of iron in a solution of sulphate of alumina will take place if there be introduced into the solution of alum alkaline sulphides, sulphides of alkaline earths, or sulphides of all metals which directly or indirectly decompose water, or such metals that by cold or boiling sulphuric acid evolve hydrogen. By this addition the peroxide of iron is rapidly and most thoroughly reduced to the protoxide of iron.

As the soluble sulphides of the alkalies and alkaline earths work somewhat too rapidly, and besides, if sufficiently pure, are rather expensive, I prefer to use sulphides of some of the heavy metals, of which the sulphide of zinc or blende ground to an extremely fine powder works best; but where it is desirable to have an alum free from zinc native sulphide of lead or galena in the state of a fine powder can be used, and in this case, besides sulphur, insoluble sulphate of lead is formed.

In my process the peroxide of iron can be reduced both in a basic and acid alum solution.

I prefer, after having rendered the aluminous material soluble by sulphuric acid, to leach off the ferruginous aluminous sulphate, and then add the finely-powdered blende or galena in quantities sufficient to reduce the peroxide of iron, but variably, according to the quantity of iron present, and then the mixture is boiled sharply until the reaction is completed. The protoxide of iron remains in the aluminous solution, and also remains in the aluminous cake; but it does not color it, as the peroxide of iron, when reduced to the protoxide, is colorless. Then the precipitate is allowed to settle, and the clear solution is drawn off and evaporated, as usual, to 45°—50° Baumé, and then run into cakes.

The aluminous cake thus produced appears perfectly white.

I do not claim the use of sulphides, broadly; but I do claim the process of making aluminous cake when they are added to acid solutions of the aluminous material.

Having thus described my invention, what I claim, and desire to secure by Letters Patent, is—

The herein-described process for manufacturing a white aluminous cake from ferruginous aluminous sulphate by treating the aluminous sulphate in solution with alkaline sulphides, sulphides of alkaline earths, or metallic sulphides, substantially as herein set forth.

In testimony of which invention I hereunto set my hand.

CARL V. PETRAEUS.

Witnesses:
GORDON SECKEL,
FRANK WILLING LEACH.